Nov. 28, 1939.　　　G. E. MOORE　　　2,181,735
DRIVE MECHANISM
Filed May 31, 1938　　　4 Sheets-Sheet 1
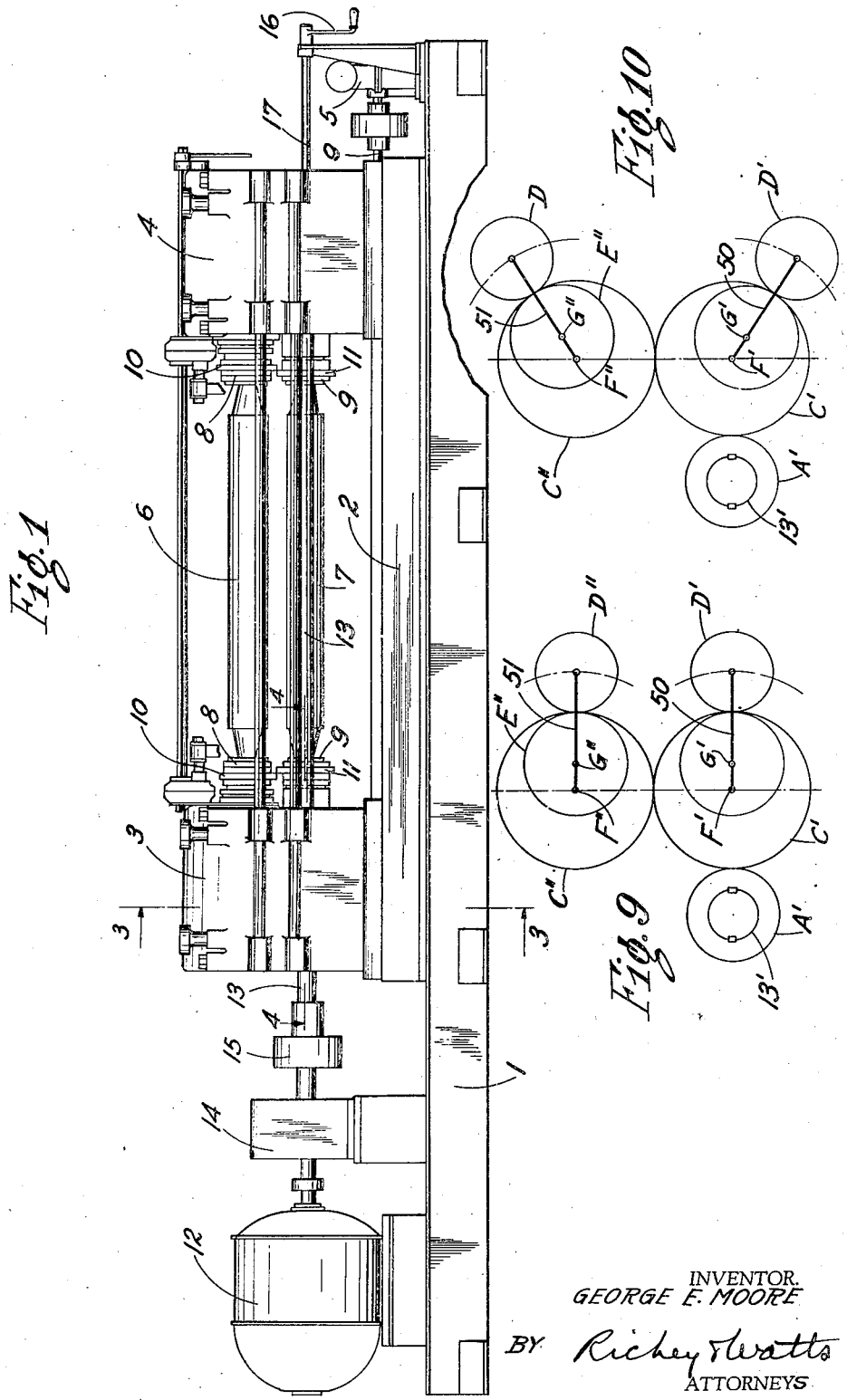
INVENTOR.
GEORGE E. MOORE
BY Richey & Watts
ATTORNEYS Nov. 28, 1939.  G. E. MOORE  2,181,735
DRIVE MECHANISM
Filed May 31, 1938  4 Sheets-Sheet 2
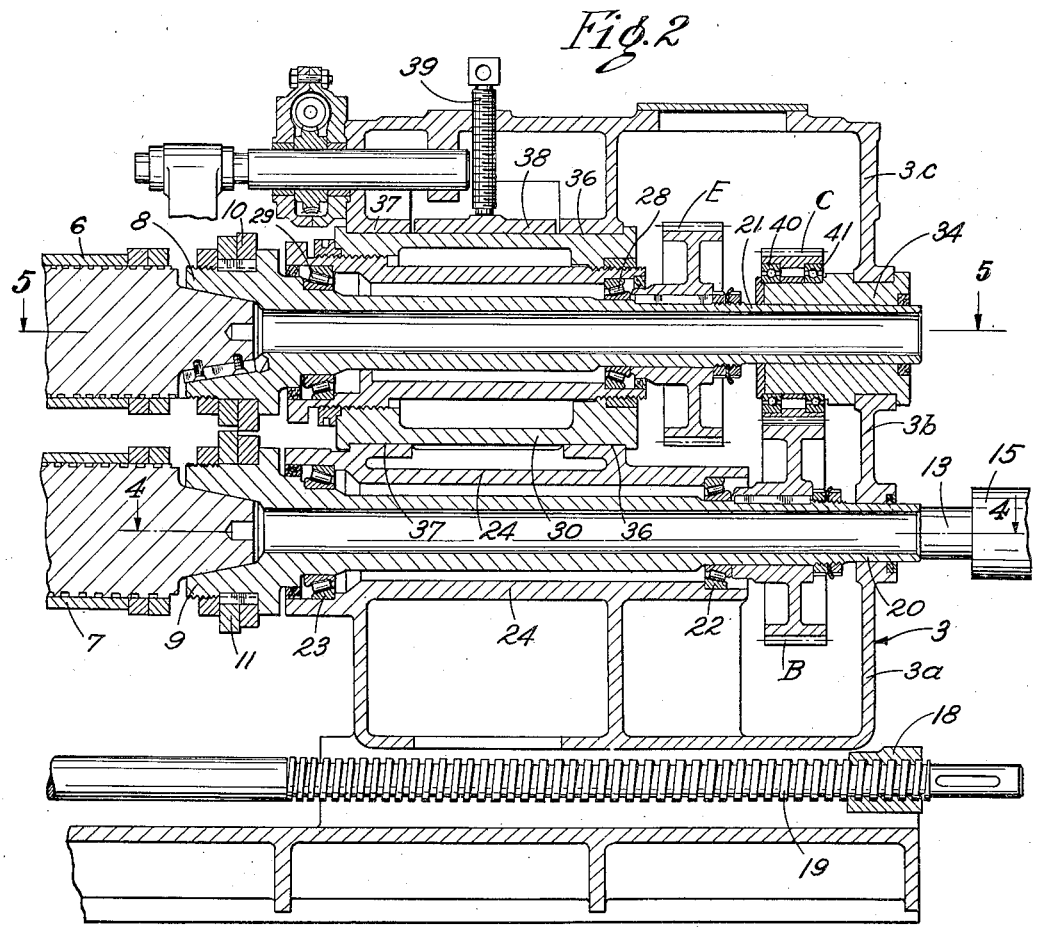
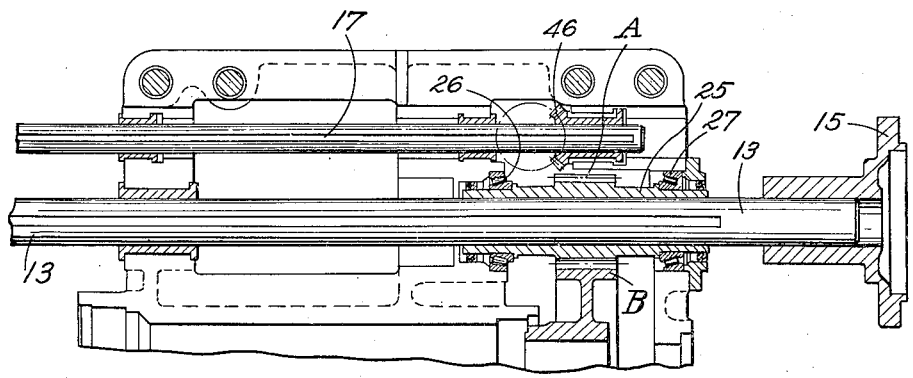
INVENTOR.
GEORGE E. MOORE
BY
Richey & Watts
ATTORNEYS Nov. 28, 1939.      G. E. MOORE      2,181,735
DRIVE MECHANISM
Filed May 31, 1938      4 Sheets-Sheet 4
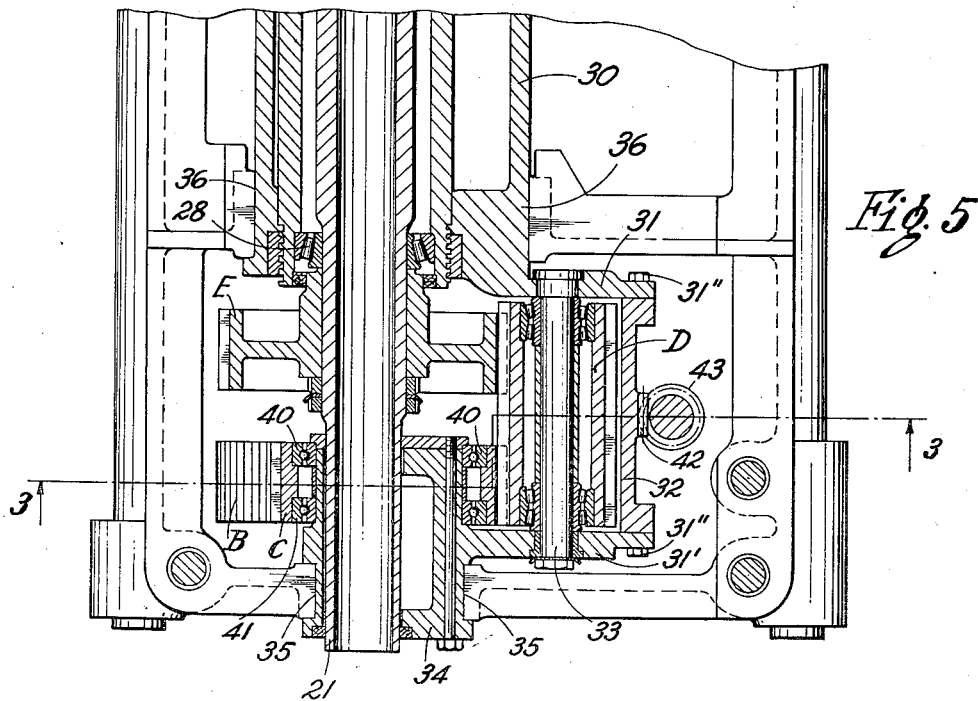
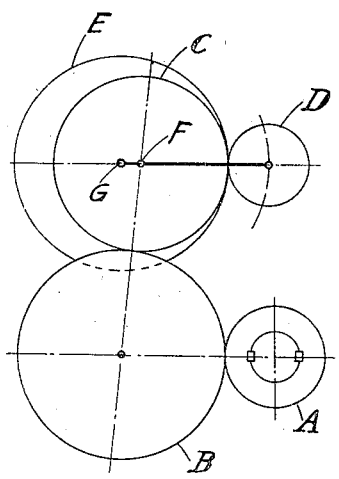
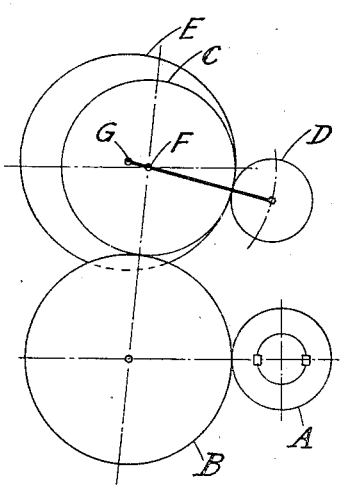
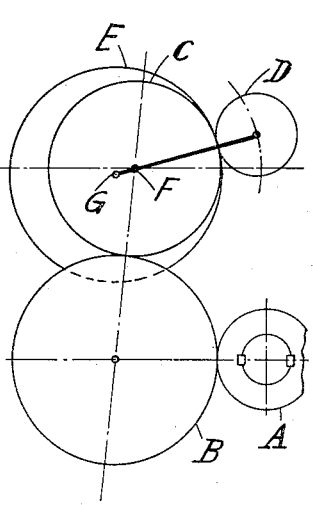
INVENTOR.
GEORGE E. MOORE
BY
Richey & Watts
ATTORNEYS Patented Nov. 28, 1939

2,181,735

UNITED STATES PATENT OFFICE 2,181,735

DRIVE MECHANISM

George E. Moore, Youngstown, Ohio, assignor to The Aetna Standard Engineering Company, Youngstown, Ohio, a corporation of Ohio Application May 31, 1938, Serial No. 210,857

11 Claims. (Cl. 74—397)

This invention relates to drive mechanism and more particularly to an improved adjustable drive mechanism for rotary shears for trimming and slitting metal and for other mechanisms in which it is desired to drive a pair of shafts or spindles and permit adjustment of such shafts or spindles toward and away from each other without necessarily stopping or modifying the rotation thereof in any way.

In metal trimming and slitting shears having rotary disc knives these disc cutters or knives are commonly sharpened by grinding off the periphery thereof. This decreases the diameter of the knives and unless means are provided for adjusting the driving spindles or shafts upon which the knives are mounted toward and away from each other the useful life of the knives is greatly reduced. The adjustment of the shafts or spindles of each pair of cutting knives is also very helpful in obtaining the proper cutting action and, as my invention may be particularly advantageously employed in connection with metal slitting and trimming shears, I have illustrated and described herein such an apparatus incorporating my improved drive mechanism.

It will be understood, however, that although my invention is illustrated as embodied in a slitting and trimming shear it is readily applicable to rolling mills where it is desired to adjust a pair of rolls toward or away from each other in a simple manner and without shutting down the mill. In fact, wherever a pair of shafts are to be driven together and it is desired to make provision for the adjustment of the shafts toward and away from each other without changing or interfering with the drive mechanism my invention provides a simple and effective solution for the problem.

It is among the objects of my invention to provide a drive mechanism whereby a single source of power may be used to rotate a pair of shafts or spindles in opposite directions and whereby the shafts may be adjusted toward or away from each other without disturbing the driving relation between the two shafts and without necessarily stopping the rotation of the shafts; the provision of means for adjusting the center to center spacing of a pair of driven shafts which will automatically be locked and maintaining itself in any desired position of adjustment; the provision of a drive mechanism in which, by a relatively simple arrangement of gears, a pair of shafts or spindles may be supported for simultaneous rotation in opposite directions and in definite speed relations and the adjustment of the center to center spacing of such shafts or spindles effected by simple manual operation without adjustment or taking down of any of the parts of the drive mechanism; the provision of an improved slitting and trimming shear drive whereby adjustment of the cutting knives can readily be made to accommodate materials of different thicknesses and changes in the diameter of the cutting knives due to wear, sharpening, replacement, etc.

The above and other objects of my invention will appear from the following description of a preferred embodiment thereof, reference being had to the accompanying drawings, in which—

Figure 1 is an elevational view, looking toward the entering side of a slitting and trimming shear for metal sheets or strip, the machine as illustrated being set up to trim the opposite side edges of the moving material.

Figure 2 is an enlarged vertical cross-sectional view taken substantially on line 2—2 of Figure 3, and illustrating the drive mechanism at one end of the machine shown in Figure 1.

Figure 3:
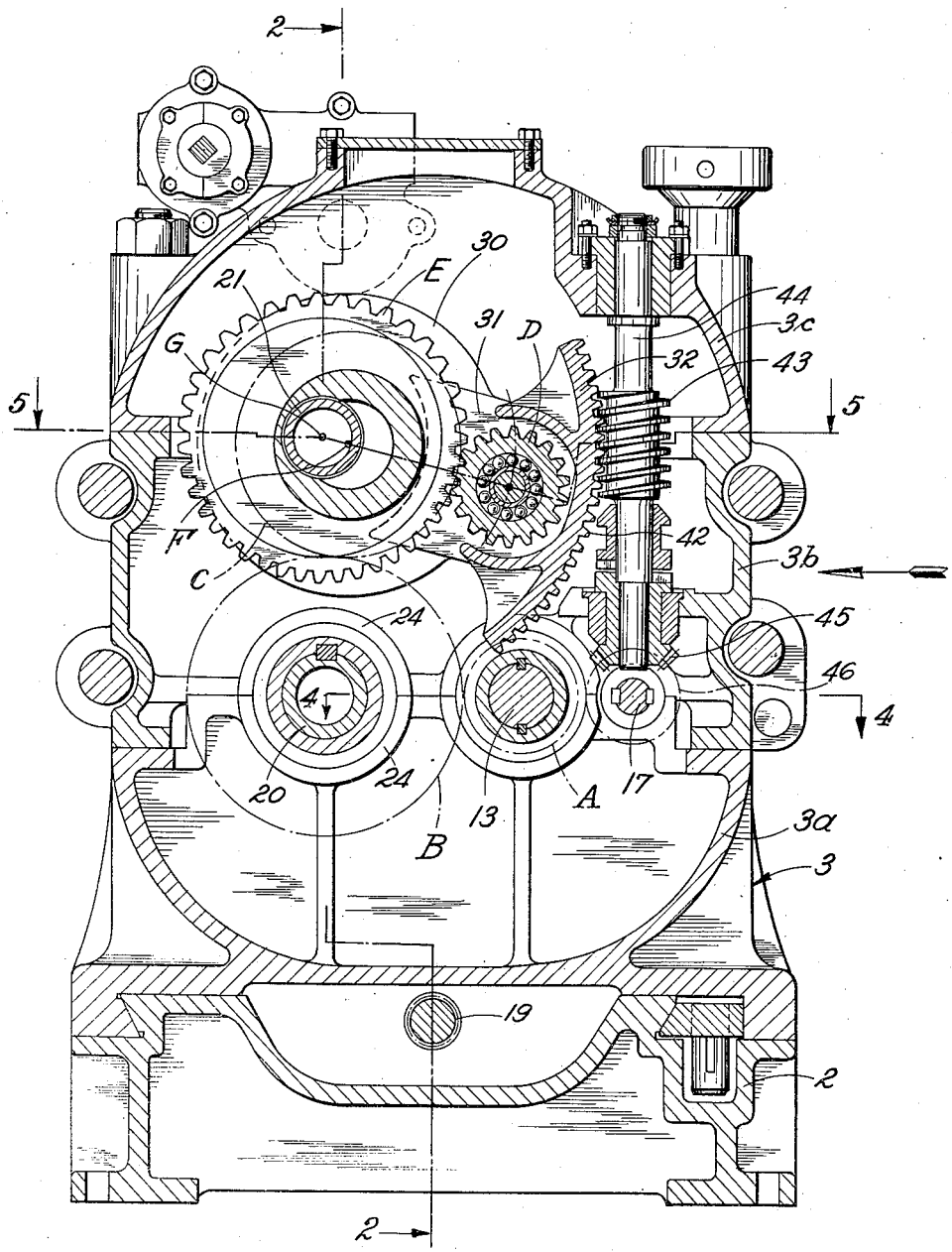

Figure 3 is an enlarged vertical cross-sectional view through the drive or motor end driving mechanism of the machine shown in Figure 1, taken substantially on line 3—3 of Figures 1 and 5, and drawn to a slightly larger scale than Figures 2, 4, and 5.

Figure 4 is a fragmentary horizontal cross-sectional view of my improved drive mechanism, taken on line 4—4 of Figures 2 and 3.

Figure 5 is a horizontal cross-sectional view taken on line 5—5 of Figures 2 and 3.

Figure 6 is an illustrative diagrammatic view of the gearing of my improved adjustable drive mechanism with the center of the upper spindle in its mid or normal position.

Figure 7 is a view similar to Figure 6 but illustrating the drive mechanism in a position with the upper spindle moved away from the lower spindle to increase the center to center spacing between the spindles.

Figure 8 is a view similar to Figures 6 and 7 but showing the upper spindle moved toward the lower spindle to reduce the center to center spacing therebetween.

Figure 9 is a diagrammatic view generally similar to Figures 6, 7 and 8 but illustrating a modified form of my invention in which both the upper and lower shafts are adjustably supported.

Figure 10 is a view similar to Figure 9 but illustrating the shafts in separated position.

Referring to Figure 1, a slitting and trimming shear is illustrated in a somewhat simplified manner. The apparatus consists essentially of a base 1 on which is supported a sub-base 2 for the spindle drive mechanisms. Spindle supporting housings 3 and 4 are slidably mounted on the base 2 for movement toward and away from each other. This adjustment is provided to make possible the accommodation of different widths of strip or sheets and may be effected by means of a driving mechanism generally indicated at 5. Mandrels 6 and 7 extend between the two housings 3 and 4 and are driven by the spindles 8 and 9. As illustrated, no knives are shown on the mandrels 6 and 7 but it will be understood that, when it is desired to slit the sheet or strip, any suitable number or arrangement of knives may be carried by the mandrels. Trimming knives 10 and 11 are mounted on each of the spindles 8 and 9 and are adapted to trim the edges of material which is fed through the machine from the front side thereof, as seen in Figure 1.

A motor 12 drives the shaft 13 through a suitable speed reducing box 14 and coupling 15. As will be more fully explained later, the driving shaft 13 is connected to drive the spindles 8 and 9 which are carried by the drive end housing 3 and also extends across between the housings 3 and 4 and drives the spindles 8 and 9 of the housing 4 in the same manner. The housings 3 and 4 are adapted to move axially of the shaft 13, a keyway being provided in the shaft 13 to permit driving engagement to be maintained with the gearing in the housings 3 and 4.

As the arrangement of the driving mechanism for the spindles 8 and 9 is exactly the same in both the housing 3 and the housing 4 it will be necessary for purposes of this specification only to describe the construction of one of the drive mechanisms. It will be understood therefore that although reference hereinafter is made only to the mechanism in the housing 3 a similar mechanism will be contained in the housing 4 so that, when the spindle adjusting handle 16 is turned to rotate the adjusting drive shaft 17, both of the upper spindles 8 will be simultaneously moved and maintained in the same relation to their corresponding lower spindles 9.

Referring to Figures 2, 3, 4 and 5, the housing 3 is made in three superimposed sections, the lower section 3ᵃ being adapted to slide on the sub-base 2 and is provided with a nut 18 which engages the threaded shaft 19. When the shaft 19 is rotated by the mechanism 5 (shown in Figure 1) the housing 3 may be moved on the base 2. The intermediate section 3ᵇ rests upon the bottom section 3ᵃ and the top section 3ᶜ is supported by the section 3ᵇ. The bottom spindle 9 is integrally formed with a hollow shaft 20 and the top spindle 8 is integrally formed in a similar manner with the top shaft 21. In the illustrated embodiment of my invention the bottom shaft 20 is rotatably supported in bearings 22 and 23 which are in turn supported by the tubular supporting member 24, the bottom half of which is a part of the lower section 3ᵃ of the housing and the upper half of which is a part of the intermediate section 3ᵇ of the housing.

The drive shaft 13 which transmits power from the driving motor 12 extends through a sleeve member 25 and has a sliding keyed engagement therewith. This sleeve member 25 is rotatably supported by bearings 26 and 27 which are mounted in the housing 3. By means of this sliding key arrangement adjustment of the position of the housing 3 on the base 2 is permitted without moving the shaft 13, the sleeve 25 merely sliding on the shaft 13 during such adjustments and maintaining at all times its keyed driving connection thereto.

A gear A is formed on the sleeve 25 and engages a gear B which is secured to the lower shaft 20. Thus, the motor 12 is connected to drive the lower shaft 20 through the shaft 13 and the gears A and B. The upper spindle shaft 21 is supported by bearings 28 and 29 (see Figs. 2 and 5) which bearings are eccentrically supported in a tubular sleeve member 30. This sleeve member 30, as is shown in Figure 5, has an outwardly extending arm portion 31 which is secured to the gear segment carrying member 32 and the arm 31', bolts 31'' serving to hold the assembly together. A pin or shaft 33 extends across between the arm portions 31 and 31' and assists in clamping the gear segment member 32 therebetween, as well as supporting the gear D, as will be later explained. The arm 31' is integrally formed with the sleeve member 34 and for purposes of the present description the members 30, 31, 32, 31' and 34 may all be considered as an integral sleeve structure having an arm extending therefrom and will be referred to as a unit by the designation 30—34. The portion 34 of this sleeve structure has a bearing in the housing 3 at 35 and its enlarged cylindrical portion 30 has a bearing in the housing 3 at 36 and 37. As is clearly seen in Figure 5 the upper shaft 21 is mounted eccentrically in relation to the center of rotation of the sleeve member 30—34 and rotation of the sleeve member 30—34 in its support in the housing 3 will cause the shaft 21 to be lifted or lowered thus changing its center to center distance from the lower shaft 20.

A shoe 38 engages the drum shaped sleeve 30 (see Fig. 2) and may be tightened into firm contact therewith by means of the screw 39. The function of the shoe 38 is to take up any looseness or slack in the bearings of the sleeve member 30—34 when in adjusted position and it will be loosened during adjustment of the spindle shafts.

The gear B which is secured to and drives the lower shaft 20 also engages the gear C. As is best seen in Figure 5 the gear C is mounted on bearings 40 and 41 on the portion 34 of the sleeve member 30—34 and is concentrically located relative to the center of the rotation of the sleeve member 30—34 in the housing 3. An elongated gear D is supported for free rotation on the shaft or pin 33 and engages at one end with the gear C. The other end of the gear D engages a gear E which in turn is secured to and drives the upper spindle shaft 21.

As is best seen in Figure 3, the gear segment member 32 carries a gear segment 42. A worm 43 is vertically supported on a shaft 44 which has suitable bearings in the housing 3 and is provided at its lower end with a bevel gear 45. The adjusting shaft 17 also carries a bevel gear 46 which engages gear 45 and it will be seen that when the shaft 17 is rotated the bevel gears 45 and 46 will co-act to rotate the shaft 44 and the worm 43, being in engagement with the gear segment 42. will cause the sleeve-member 30—34 to rotate about its fixed center F. During such movement of the gear segment 42 and the sleeve member 30—34 the center to center distances between pairs of gears A and B, B and C, C and D, and D and E will all remain the same and thus the gears will remain in mesh and in proper driving engagement. However, during such movement of the segment 42 the floating center G of the gear E and the upper shaft 21 will move relative to the center F and relative to the center of the lower shaft 20.

The illustrative diagrams, Figures 6, 7 and 8, show the arrangement of gears A, B, C, D, and E and of the fixed center F of the adjusting sleeve or bracket member 30—34 and the movable center G of the upper shaft. In Figure 6 the gear D is shown in mid-position with its center located on a horizontal line drawn through the fixed center F and the movable center G of the upper shaft 21. In Figure 7 the gear D has been moved downwardly by turning the worm 43 until the parts assume substantially the position shown in Figure 3. As the gear D is moved downwardly the center G of the upper shaft 21 moves upwardly. However, as the center to center distance between the gears D and E is maintained constant because both are supported on the sleeve member 30—34, the gears remain in unchanged driving engagement. Thus, by this adjustment of the gear D the center to center distance between the gears B and E is increased and the shafts 20 and 21 are moved apart. Due to the fact that the supporting member for the gears C and D normally lies in a substantially horizontal plane the adjusting movements thereof do not appreciably change the relation between shafts 20 and 21 except to increase their vertical spacing.

In Figure 8 the same parts are illustrated as are shown in Figures 6 and 7 but the gear D has been moved upwardly from its normal position causing the center G to move downwardly thus decreasing the distance between the shafts 20 and 21.

From the above description it will be seen that by merely turning the handle 16, which rotates the shaft 17, in the proper direction the worm 43 will be turned to move the gear segment 42 and the arm portions of the sleeve member 30—34 upwardly or downwardly with resulting adjustment of the center to center distance between the two spindle shafts 20 and 21 and between the spindles 8 and 9 carried thereby. This adjustment may be made even though the shafts are being driven at full speed and load because the adjustment does not involve any change in the spacing between meshing gears of the chain A, B, C, D and E. As the worm 43 and gear segment 42 form an irreversible connection the shafts 20 and 21 will remain in any position of adjustment. With my driving mechanism the spacing between the spindles of a slitting and trimming shear or the like may be adjusted with great accuracy and without dismantling or removing any gears or parts whatsoever. The adjustments may be made while the machine is operating or while it is standing still and as the entire mechanism is fully enclosed in a protective housing it may readily be lubricated and will function for long periods of time without trouble or attention.

In cases where a greater range of adjustment of the spacing between a pair of shafts is desired or where, for any reason, it is desired to have both shafts adjustable a modified form of my invention illustrated in Figures 9 and 10 may be employed. In these figures the drive gear A' is driven from the drive shaft 13' and engages a gear C' which is rotatably and concentrically mounted on a sleeve similar to the sleeve 30—34 of the previously described embodiment of my invention and whose center of rotation is indicated at F' in Figure 9. The gear D' is carried by the sleeve member, which may be diagrammatically represented by the straight line 50 in Figur 9, and engages the gear C'. Gear E' is eccentrically mounted on the sleeve member 50 with its center at G' and this gear is secured to and drives a shaft in the same manner as the gear E in the previously described embodiment of my invention. The driving connection to the upper shaft is established by engagement of the gear C' with the gear C'' which is also concentrically mounted in relation to the center of rotation F'' of the sleeve member indicated at 51. Gear C'' engages gear D'' which in turn engages gear E''. The center of gear E'' is shown at G'' and is eccentrically arranged relative to the center F'' of the gear C''. With the arrangement illustrated it will be seen that by moving the gears D' and D'', and the sleeve members 50 and 51 which carry them, about the centers F' and F'', the centers G' and G'' will be moved without throwing any of the gears out of mesh or changing their driving relationships in any way. If the gear D' is moved down and the gear D'' is moved up, as shown in Figure 10, the maximum spacing between the centers G' and G'' will be obtained while if gears D' and D'' are moved toward each other the centers G' and G'' will be brought closer together. Any suitable means, such as the worm and gear segment arrangement shown in Figure 3, may be employed for moving the sleeve members 50 and 51 about their fixed centers of rotation F' and F''. With an arrangement such as shown in Figures 9 and 10 a greater range of adjustment may be obtained than with that shown in the other figures of the drawings. Although the details of the construction of the modification shown in Figure 9 are not shown, it will be understood that parts generally similar to those in the other figures may be employed.

Although I have described the illustrated embodiment of my invention in considerable detail it will be understood that modifications and variations in the structures employed in carrying out my invention and in the arrangement and proportions of the various parts may be made without departing from the spirit of my invention. I do not, therefore, wish to be limited to the specific form and arrangement herein shown and described but claim as my invention all embodiments thereof coming within the scope of the appended claims.

I claim:

1. In a drive mechanism of the type described, a housing, a sleeve member supported for rotation in said housing, a gear rotatably mounted on said sleeve member and having its center of rotation spaced from and in fixed relation to the center of rotation of said sleeve member, a shaft rotatably supported by said sleeve member and having its center spaced from and in fixed relation to the center of rotation of said sleeve member and spaced from and in fixed relation to the center of rotation of said gear, driving connections between said shaft and gear, another gear supported rotatably and concentrically with the center of rotation of said sleeve member and engaging said first named gear, and means for driving said second named concentrically supported gear.

2. In a drive mechanism of the type described, a housing, a sleeve member supported for rotation in said housing, a gear rotatably mounted on said sleeve member and having its center of rotation spaced from and in fixed relation to the center of rotation of said sleeve member, a shaft rotatably supported by said sleeve member and having its center spaced from and in fixed relation to the center of rotation of said sleeve member and spaced from and in fixed relation to the center of rotation of said gear, driving connections between said shaft and gear, another gear supported rotatably and concentrically with the center of rotation of said sleeve member and engaging said first named gear, means for driving said second named concentrically supported gear, and means for imparting limited rotary movement to said sleeve member whereby the position of said shaft in said housing may be varied.

3. In drive mechanism of the type described, a supporting frame or housing, a rotatable sleeve member supported by said housing, a shaft carried by said sleeve and disposed eccentrically of the center of rotation of said sleeve, a gear on said shaft, a gear carried by said sleeve and engaged by said gear on said shaft, said gear carried by said sleeve being freely rotatable and eccentrically disposed relative to the center of said sleeve, a gear concentrically and rotatably mounted on said sleeve and engaging said gear carried by said sleeve, means for driving said concentrically mounted gear, a gear segment on said sleeve, a worm carried by said frame and engaging said gear segment, and means for rotating said worm.

4. In drive mechanism of the type described, a frame or housing, a sleeve member supported by said frame, means for imparting rotational movement to said sleeve, a shaft carried by said sleeve and eccentrically disposed relative to the center of rotation of said sleeve whereby rotation of said sleeve in said housing will change the position of said shaft relative to said housing, and means carried by said sleeve for completing driving connection to said shaft regardless of the position of said sleeve relative to said frame or housing.

5. In drive mechanism of the type described, a frame or housing, a sleeve member supported by said frame, means for imparting rotational movement to said sleeve, a shaft carried by said sleeve and eccentrically disposed relative to the center of rotation of said sleeve whereby rotation of said sleeve in said housing will change the position of said shaft relative to said housing, and means carried by said sleeve for completing driving connection to said shaft regardless of the position of said sleeve relative to said frame or housing, said means for rotating said sleeve being manually operable from outside of said frame or housing.

6. In drive mechanism of the type described, a frame or housing, a sleeve member supported by said frame, a shaft carried by said sleeve and eccentrically disposed relative to the center of rotation of said sleeve whereby rotation of said sleeve in said housing will change the position of said shaft relative to said housing, means carried by the sleeve for completing driving connections to said shaft regardless of the position of said sleeve relative to said frame or housing, and means for turning said sleeve in said housing, said last named means including a gear segment secured to said sleeve, a coacting gear engaging said gear segment, and means manually operable from outside of said housing for rotating said coacting gear.

7. In apparatus of the type described, a frame or housing, a sleeve member rotatably supported in said housing, a rotatable shaft carried by said sleeve member and mounted eccentrically thereof, a gear concentric with said sleeve member and freely rotatable relative thereto, means for driving said gear, and driving connections from said concentric gear to said eccentric shaft, said connections being carried by and movable with said sleeve member.

8. In apparatus of the type described, a frame or housing, a sleeve member rotatably supported in said housing, a rotatable shaft carried by said sleeve member and mounted eccentrically thereof, a gear concentric with said sleeve member and freely rotatable relative thereto, means for driving said gear, driving connections from said concentric gear to said eccentric shaft, said connections being carried by and movable with said sleeve member, and means for imparting rotational movement to said sleeve member.

9. In apparatus of the type described, a frame or housing, a pair of parallel shafts, a pair of supporting sleeve members for said shafts, said sleeves being rotatably supported by said housing and said shafts being eccentrically mounted in said sleeve members, a pair of engaging gears concentric with said sleeve members, means for driving one of said concentric gears, geared connections on each of said sleeve members for completing driving connections to said shafts, and means for imparting rotational movement to said sleeve members.

10. An adjustable drive mechanism of the type described including a housing, a shaft rotatably supported by said housing, a gear secured to said shaft, means for driving said gear and shaft, a sleeve rotatably mounted in said housing and having an arm portion, a second gear concentrically and rotatably mounted on said sleeve and engaging said first gear, a third gear rotatably supported on said arm portion of said sleeve and engaging said second gear, a second shaft rotatably supported in said sleeve in eccentric relation to the mounting of said sleeve in said housing, a fourth gear secured to said second shaft and engaging said third gear, and means for turning said sleeve and arm relative to said housing whereby said eccentrically mounted second shaft may be moved to vary the center to center spacing between said first and second shafts without changing the center to center distance between any two engaging gears.

11. In drive mechanism of the type described, a pair of rotatable shafts and means for supporting and driving said shafts whereby the center to center spacing of said shafts may be varied, said supporting and driving means including a source of power connected to rotate one of said shafts, a rotatably supported sleeve member, a gear carried by said sleeve member and having its center spaced from and in fixed relation to the center of rotation of said rotatable sleeve, another gear rotatably and concentrically mounted on said sleeve and completing driving connections from said one of said shafts to said first named gear, the other of said shafts being rotatably carried by said sleeve member and having its center spaced from and in fixed relation to the center of rotation of said sleeve member, and driving connections from said first named gear to said other shaft.

GEORGE E. MOORE.